Figures 1, 6:
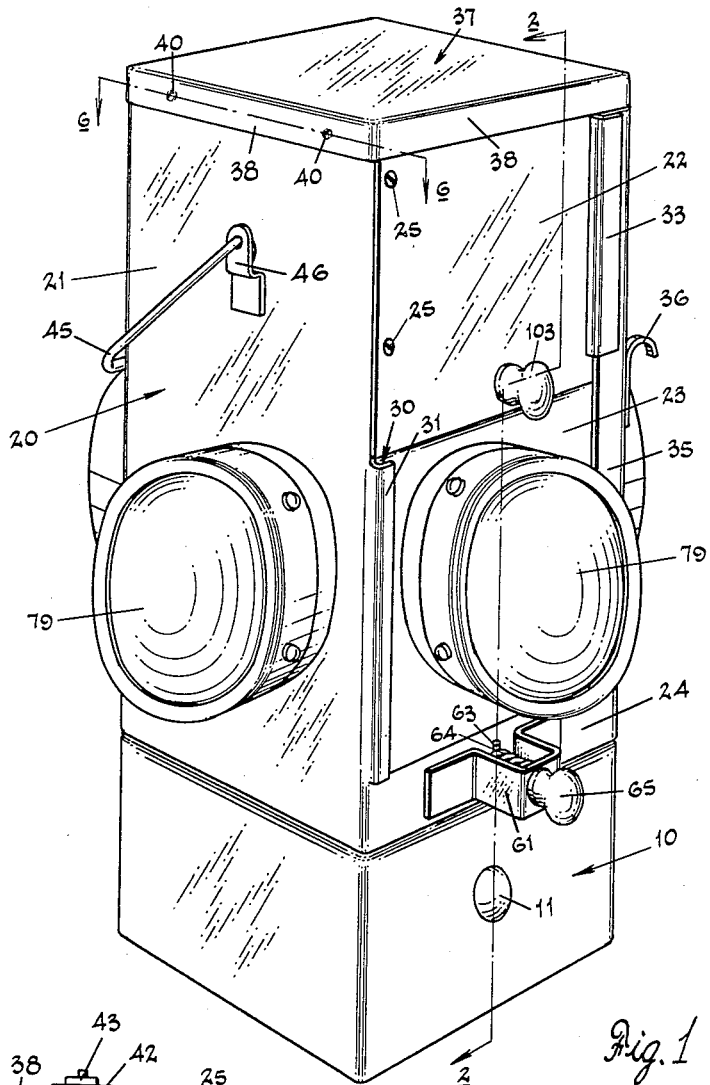

Jan. 17, 1956   L. G. CLEVIDENCE ET AL   2,731,546
MARKER LIGHT
Filed Feb. 8, 1955   3 Sheets-Sheet 1

INVENTORS
Lewis G. Clevidence and
BY Richard B. Crippen

ATTORNEY

Jan. 17, 1956     L. G. CLEVIDENCE ET AL     2,731,546

MARKER LIGHT

Filed Feb. 8, 1955     3 Sheets-Sheet 2

INVENTORS
Lewis G. Clevidence and
BY Richard B. Crippen

ATTORNEY

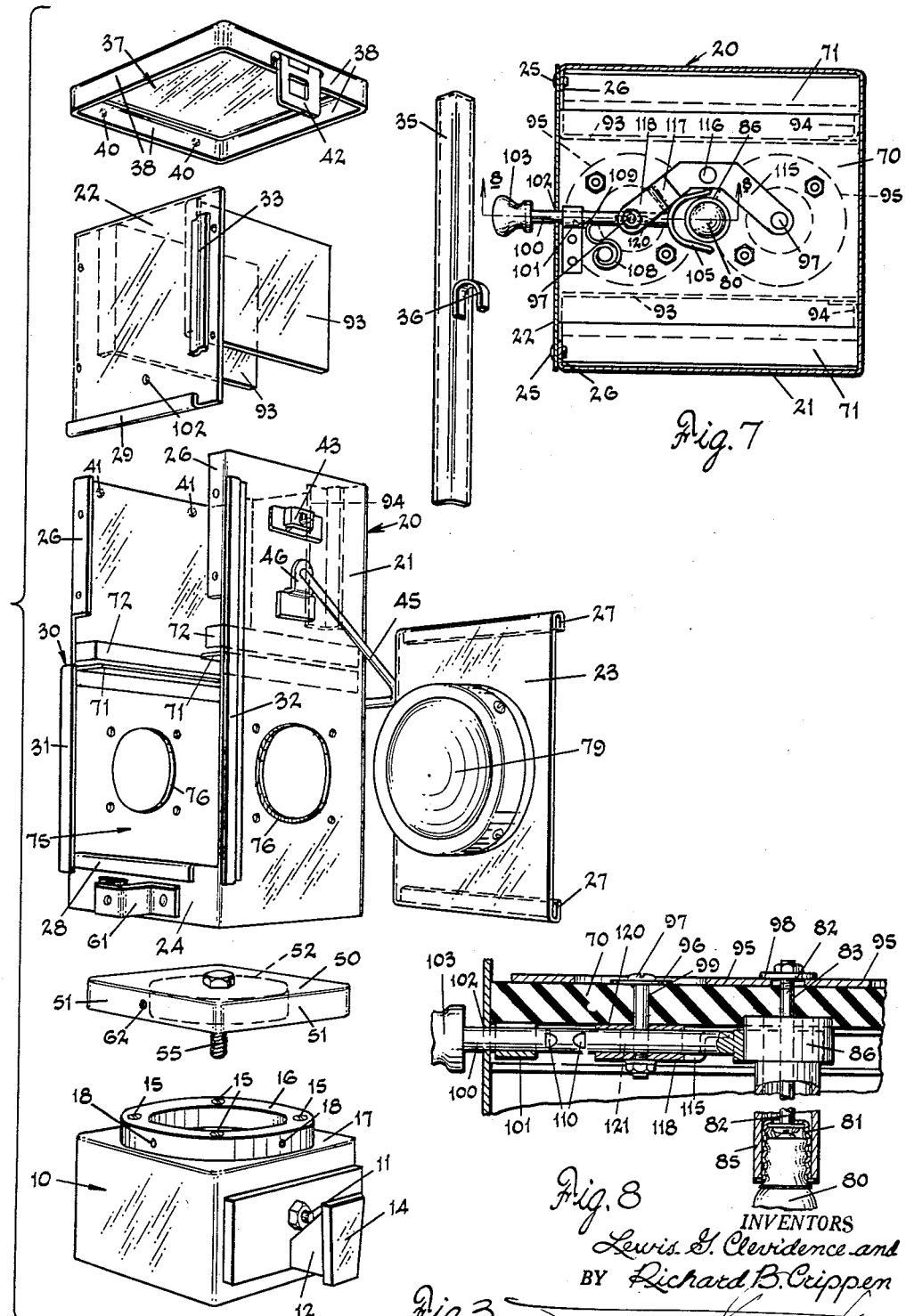

United States Patent Office 2,731,546
Patented Jan. 17, 1956

2,731,546

MARKER LIGHT

Lewis G. Clevidence and Richard B. Crippen, Toledo, Ohio, assignors of one-third to said Clevidence, one-third to said Crippen and one-third to Henry A. Barror, Toledo, Ohio Application February 8, 1955, Serial No. 486,942

5 Claims. (Cl. 240—24)

Our invention relates to the signal art and particularly to signalling with light producing elements on railway trains and the like. One embodiment of our invention provides a train signal marker light.

As is known to those familiar with train signals, a marker light is placed at the rear of the last car of every train. More often there are two such lights. Between the hours of sunset and sunrise, during fog, heavy rain or snow or when, due to clouds, smoke, or operation in a tunnel, vision of the train becomes obscure, the marker light is lit.

A conventional marker light has four ports, each containing a lens. The central axes of the ports in these lights are in a right angle relation to each other so that when one port of the light faces rearwardly of the train the opposite port faces forwardly of the train and the remaining two ports face outwardly from opposite sides of the train. The lens in two of the opposite ports are amber or clear glass and the lens in one of the other ports is of red color and the other of green color.

The train brakeman is usually charged with the responsibility of seeing to it that the marker light is available, is lit, and is properly exhibited at the proper time. When the train is on the main line, whether running or standing, the marker light must be positioned to show the red lensed port rearwardly and the green lensed port forwardly and the amber ports to either side of the train. When the train moves off the main line, as to a siding, the marker light must be positioned to show the green lensed port rearwardly and the red lensed port forwardly of the train. Moving the marker lights to first exhibit the red lensed port rearwardly and then forwardly of the train is sometimes called "turn-signalling" and is very often the train brakeman's responsibility.

We propose by our invention to provide an electric battery powered marker light having the features of portability, large battery holding capacity, a vibration proof switch and current carrying system and a weather protected turn-signalling support. In addition our invention provides a marker light having a housing formed to have a removable wall permitting quick and easy accessibility to the lantern or light source chamber and lens within the lamp but so related in overlap and jointery as to resist the entrance of lamp corroding weather elements, particularly, the seeping of driving rain and snow into said lamp chambers as to blur the lens and short the bulb.

It is also an object of our invention to provide means by which the closure of the lantern chamber in the lamp is locked by the closure of the battery holding chamber thereby assuring a lock up of all lamp chambers by the one operation of closing the battery holding chamber.

The invention has for further objects to provide other advantageous structures and arrangements which will appear from the following description and an examination of the accompanying drawings. Structures containing our invention may have various forms. We have selected a marker light which constitutes a specific embodiment of our invention and shall describe the same hereinafter since it now appears to us as the best mode of carrying out our invention. Reference to the accompanying drawings has been had to facilitate such description. In making such description of or reference to the chosen structure, however, we do not imply that variations therefrom which embody our invention manifest herein are beyond the contemplation of our invention.

Figure 2:
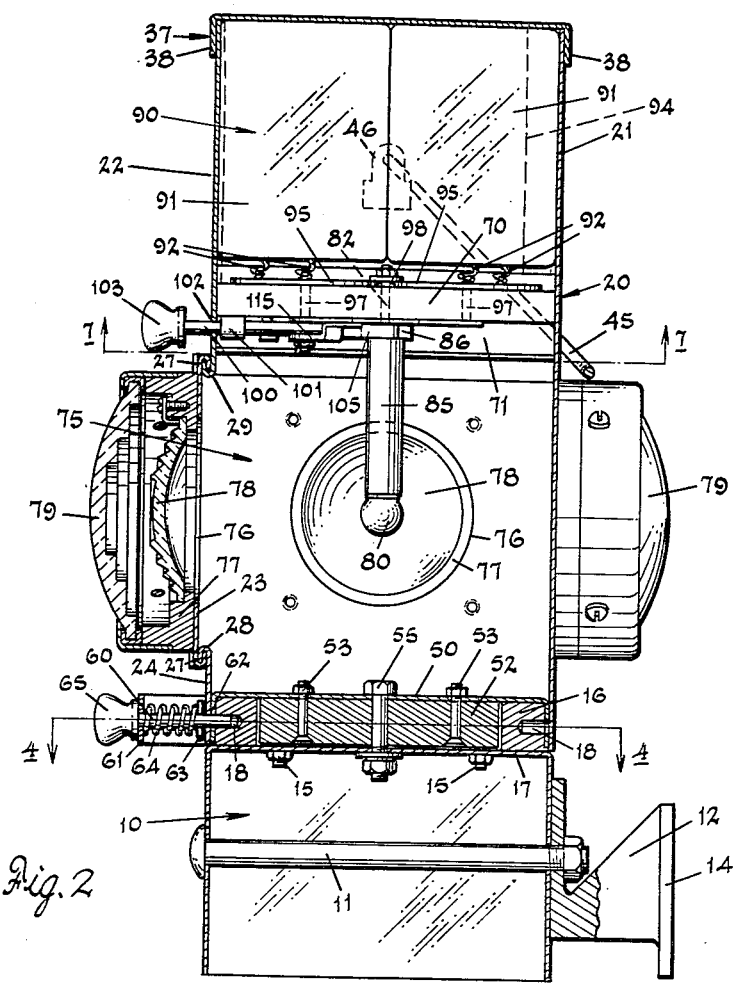
Figure 5:
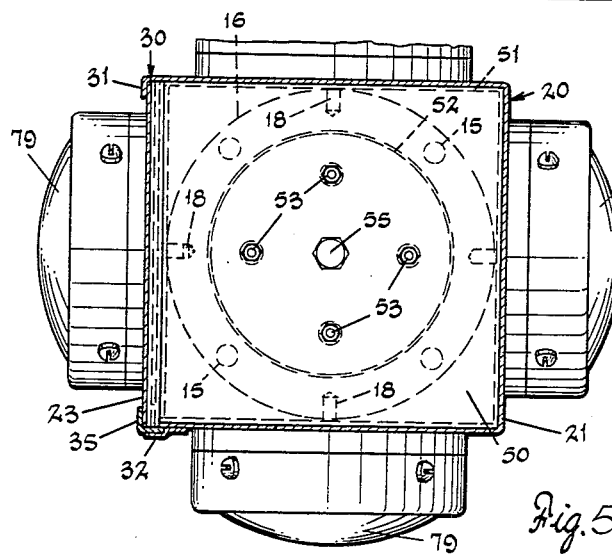
Figure 4:
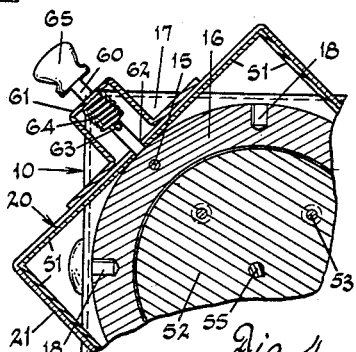

Figure 1 of the accompanying drawings illustrates a perspective view of a marker light embodying features of our invention. Figure 2 is a view of a section taken along the plane of the line 2—2 indicated in Figure 1. Figure 3 is a perspective view of components which, when assembled, form the housing parts of the marker light shown in Figure 1. Figure 4 is a view of a section of the marker light taken along the plane of the line 4—4 indicated in Figure 2 with certain components relatively moved from positions shown in Figure 2. Figure 5 is a view of transverse section through the lamp chamber of the marker light. Figure 6 is a view of a section taken along the plane of the line 6—6 indicated in Figure 1. Figure 7 illustrates a view of a section taken along the plane of the line 7—7 indicated in Figure 2. Figure 8 is an enlarged view of a section taken along the line 8—8 indicated in Figure 7.

The marker light chosen by us for purposes of illustration and shown in the accompanying drawings has a two part housing. One housing part 10 provides a base for supporting the other housing part 20. The housing parts 10 and 20 are vertically aligned, one above the other.

The housing part 10, providing the base for the other housing part, is formed preferably from sheet metal, shaped like an inverted four sided square cup. Connected to side of the housing part 10, by a suitably long carriage bolt 11 extending through opposite side walls of the housing part 10, is a bracket arm 12. The bracket arm 12 has a tongue portion 14 adapted to be received in a suitable slot provided on the outside wall of a railway car (not shown) usually the caboose or rear most car on the train on which the marker lights are most often mounted.

To provide mounting means to support the upper housing part 20, the housing part 10 has an annular bearing 16 affixed, as by bolt and nut assemblies 15, to the exterior surface of what would, in a cup, be the cup bottom wall 17. The annular bearing 16 has a plurality of recesses 18 in spaced relation about the bearing 16. The recesses 18 extend radially from the periphery of the bearing 16 towards the axis thereof. The recesses 18 cooperate with means, to be hereinafter described, for locking the housing parts 10 and 20 in any desired pivotal relation to which they may be moved on the aforesaid annular bearing 16.

The upper housing part 20 is formed from a sheet of metal bent to provide a vertically extending, hollow, four-sided column 21 having one open side. The open side of the column 21 is adapted to be closed by plates 22 and 23, attached as hereinafter to be described to the sheet forming the column 21, and by a tongue 24 extending from an integral with the sheet forming the column 21. The tongue 24 bridges the lower end of the open side of the column 21.

The plate 22 which serves to close the upper end of the open side of the column 21 is attached to the metal sheet forming the column 21 by means of suitable fasteners 25. The sheet forming the column 21 has parallel flanges 26 which extend towards each other from opposite edges of the open side of the column 21.

Against these flanges 26, the edges of the plate 22 may be pressed by the fasteners 25 to hold the plate 22 in a closing relation to the upper end of the open side of the column 21. This provides a more or less permanent closure of that portion of the open side of column 21. The plate 23 closing the remaining open portion of the open side of column 21 is, however, connected to the metal sheet forming the column 21 by a means that enables quick opening and access into the column 21. This is accomplished by providing for sliding the plate 23 on its supporting means now to be described.

The plate 23 has, extending along each of its upper and lower edges, a flange 27. Each of such flanges 27 is channel shape in cross-section and continuity and is adapted to slidably engage and mate with a similar channel flange 28 formed, in one case, along the upper edge of the tongue 24 and, in the other, a channel flange 29 along the lower edge of the plate 22. By this provision, when the channel flanges 27 engage the channel flanges 28 and 29 on the tongue 24 and plate 22 respectively, the plate 23 may be slid sideways into a closing position with reference to the remaining open portion of the open side of the column 21. The importance of this provision for speedy access to within the column 21 through opening closed by plate 23 will be seen hereinafter.

In order to provide a stop to limit the movement of the plate 23 on the channel flanges 28 and 29 after closure has been effected, a lineally extending stop flange 30 is provided on the column 21 at points along a line at which the edge of the plate 23 leading the plate, as the plate 23 approaches and reaches a closing position with respect to the column 21. The flange 30 is adapted to engage such leading edge of the plate 23. Preferably, the flange 30 has flashing portions 31 which overlie said leading edge of the plate 23 and the joint along which the plate 23 meets the stop flange 30, thus serving to prevent weather from penetrating therebetween.

In order to provide flashing for the opposite edge of the plate 23 and to lock the plate 23 against accidental opening, we provide the column 21 with a track part 32 extending substantially the entire length of the column 21 and proximate the vertical extending corner at which the sheet forming the column 21 and the plates 22 and 23 meet. Cooperating with the track 32 is a similar and opposite track of shorter length 33 mounted on the plate 22. A bar 35, angular in cross section, is adapted to slide on and move between the opposite tracks 32 and 33 and extend, when so positioned, over the edges along which the plate 22 and the plate 23 meet the edges of the sheet forming the column 21. The bar 35 may have a suitable handle 36 by which the bar movement in the tracks 32 and 33 may be easily controlled. When properly positioned, as shown in Figure 1 of the accompanying drawings, the bar 35 acts to cover the joint between plates 22 and 23 and the metal sheet of the column 21.

The upper end of the column 21 may be closed, as we show, by a cover 37 having edge flanges 38. The edge flanges 38 serve to not only "flash" the joint between the cover 37 and the end of the metal sheet forming the column 21 but also assist in maintaining the cover 37 in a closed position over the upper end of the column 21. To further assure retention of the cover 37 in closed position, the cover 37 may be provided with suitable teats 40 which engage relief portions 41 in one wall of the column 21. In addition, one edge flange 38 may have a hinged hasp 42 which is adapted to engage a conveniently disposed staple or keeper 43 on one wall of the column 21.

The position of the tracks 32 and 33 in relation to the thickness of the bar 35 is such that when the cover 37 is closed, the cover flanges 38 operate as a stop to restrict and resist movement of the bar 35 so as to release and uncover the plates 22 and 23 in their relation to the column 21. Thus, the end cover 37 provides means for locking up the various components of the housing part 20 in an assembled closed relation and prevents their becoming disassembled except only by opening the end cover 37.

In order to facilitate carrying the marker light, the housing part 20 may be provided with a suitable bail 45. The bail 45 is shown pivotally connected to ears 46 attached to opposite walls of the column 21.

The lower open end of the column 21 is preferably closed by a bottom 50 having means cooperating with the annular bearing 16 on the housing part 10 to support the housing part 20 for pivotal movement about a vertically extending axis. Preferably, the bottom 50 is formed from a sheet metal bent into an inverted square dish shape with edge flanges 51. When assembled, the flanges 51 tightly fit in between and are fixed to the inner end surfaces of the column 21. The bottom 50 mounts a drum bearing 52 which may be fastened by suitable bolt and nut assemblies 53 in a central zone inwardly spaced from the flanges 51. The drum bearing 52 is dimensionally adapted to nest with the annular bearing 16 on the housing part 10 and cooperate therewith in guiding the relative rotation of the housing parts about a vertically extending axis. To retain the bearings 16 and 52 in their described assembled relation, a pivot shaft bolt 55, with nut assembly, extends through suitable openings in the bottom 50 of housing part 20 and wall 17 of housing part 10.

In using our marker light to do "turn-signalling," described before, the provision of means for adjustably locking the housing parts 10 and 20 in certain various and different relations about the vertical axis of the bolt 55 is desirable. We provide such means to cooperate with the heretofore described recesses 18 formed in the annular bearing 16. Basically, said means comprises a plunger, like the pin 60 slidably mounted in a bearing bracket 61 on the tongue 24 of the metal sheet forming the column 21. The bracket 61 supports the pin 60 so that the pin extends radially relative to the vertical axis of the bolt 55 and so that the inner end of the pin may move through coaxial openings 62 in the tongue 24 and one of the flanges 51 of the bottom 50 to enter any of the recesses 18 that may then be in registering relation with said openings 62. Preferably, the pin 60 has a spring 64 which bears against the stop pin 63 in pin 60 and the bracket 61 and tends to urge the pin inwardly, as described. In order to facilitate withdrawal of the end of pin 60 from within a recess 18 and thus permit parts 10 and 20 to relatively move, the outer end of the pin 60 has a convenient handle knob 65.

Thus, the user by pulling outwardly upon the knob 65 causes the pin to withdraw from within a recess 18 and from engagement with the annular bearing 16, enabling relative rotation of the housing parts. Manual release of the knob 65 permits the pin 60 to respond to the spring 64 and when, through continued relative rotation of the housing parts, a recess 18 comes into registration with the pin end, to enter such recess again locking the housing parts against further relative rotation.

The spacing of neighboring recesses 18 on the periphery of the annular bearing 16 is related to the hereinafter described light emitting ports of a lamp chamber provided in the housing part 20. To form such lamp chamber, as well as other related chambers and zones within the housing part 20, the housing part 20 has a horizontally extending wall 70. The wall 70 is formed from a dielectric material and is adapted preferably to be supported by shelves 71. Each shelf 71 is mounted on and extends inwardly of the column 21 from opposite side walls of said column. Preferably, so that the wall 70 may be easily removed, instead of fastening the wall 70 to the shelves 71, a restrainer bar 72 extending parallel to each shelf 71 is provided. Each bar 72 and shelf 71 form, by their relation, a groove between them into and along which an edge of the wall 70 may be slid and held.

The space within the column 21 below the wall 70 provides a lamp chamber 75 and the space above the wall provides a battery chamber 90. The walls of the column 21 in the region of the lamp chamber 75 have ports 76. Plate 23 also has a port 76 of similar form and function. The ports 76 in the column 21 and plate 23 are located in quadrant positions about the vertical axis of the column 21. Each port, like the port 76 in the plate 23 shown in Figure 2 of the accompanying drawings, is surrounded by a lens mounting frame 77. Each frame 77 has portions adapted to support an inner Fresnel dioptric type lens 78 and an outer weather and coloring lens 79, in a relation and manner well known in the art. Usually, the lens 79 over each of one pair of opposite ports 76 is of amber color. The lens 79 over one of the other pair of ports 76 is of green color while the one over the other port is of red color. Thus, when a source of light within the chamber 75 is energized, beams of red, amber, green and amber light will respectively issue from the various ports 76 in the chamber 75.

A source of light, in the embodiment of our invention, is provided by an electric lamp 80. The lamp 80 is positioned by means of a socket 81 within the chamber 75 at a point in focus with the plurality of lens 78. To mechanically connect the socket 81 to the wall 70, we provide a long bolt and nut assembly 82, one end of which extends through an opening 83 in the wall 70 and the other end of which extends through an opening in the case of the socket 81. The bolt and nut assembly 82 is electrically conductive and thus provides a conductor of current of one polarity to said socket 81 and the lamp 80 mounted therein.

To provide a conductor of current of the opposite polarity and to house the bolt of the bolt and nut assembly 82, we recommend that the socket 81 and shank of the bolt of the assembly 82 be enclosed by a metal sleeve 85. The sleeve 85 has an enlarged upper end 86 recessed into and seated against the under surface of the wall 70, as shown in Figure 8 of the accompanying drawings. It will be seen that the entire assembly of socket 81 and sleeve 85 is mechanically supported on the wall 70 and electrically integrated by the use of the relatively simple and inexpensive bolt and nut assembly 82.

Turning now to a consideration of the battery chamber 90 above the wall 70, it will be noted that access may be had thereto through the cover 37. Dry cells, such as those indicated 91 in Figures 2 and 6, are disposed in the chamber 90. For advantageous reasons becoming apparent later, the cells 91 are disposed in the chamber 90 with their exposed electrode ends 92 pointing downward toward the upper surface of the wall 70. In order to provide bulkheads to brace and hold the cells 91 against movement within the chamber, we provide a pair of interior spacer walls 93. The spacer walls 93 are preferably secured to the inner surface of the heretofore described plate 22 and extend therefrom in parallel relation. The dimensions of spacer walls 93 are such that, when the plate 22 is in its described assembled relation with the column 21, the edges of spacer walls 93 abut against the inner surface of the side wall of column 21 opposite to the plate 22. Preferably, we provide a pair of angle bar braces 94 on said side wall of the column 21 which engage portions of the spacer walls 93 proximate said abutting edges thereof. These braces 94 tend to prevent deflection of the spacer walls 93, as when cells 91 may be tightly packed into the chamber 90 and between said walls 93 or tend to tip or teeter on their electrode ends 92.

To provide means by which electric current may be drawn from the cells 91 and communicated to the lamp 80, we propose that conductor elements engaging the electrode ends 92 of the cells be provided on the upper surface of the wall 70. Preferably, such conductor elements include, where two cells 91 are being used, two sets of paired bus parts, each set comprising an annular bus part 95 to engage an electrode end 92 of one polarity and a discular bus part 96 to engage an electrode end 92 of the opposite polarity. The annular bus part 95 of one set is positioned in slightly spaced tangential relation to the annular bus part 95 of the other set. The annular bus parts 95 are held in this position by a suitable washer 98 on the nut end of the bolt and nut asembly 82. The washer 98 presses against the edges of annular bus parts 95 and, being electrically conductive, electrically connects the annular bus parts 95 to the lamp socket 81.

The discular bus part 96 of each of said sets is also mounted on the upper surface of the wall 70 in coaxial relation to its associated annular bus part 95. Each discular bus part 96 is held by a bolt and nut assembly 97 extending through openings 99 provided in the wall 70. The bolt and nut assembly 97 is electrically conductive and thus provides means for transmitting current of a palarity opposite to that conducted by the annular bus parts to the under surface of the wall 70 and to a switch means now to be described.

Said switch means has, as an essential element, a hand-operated plunger type of circuit maker embodied in an electro-conductive rod 100. This rod is slidably supported in a bearing bracket 101 suitably attached to the under side of the wall 70. One end of the rod extends to the exterior of the column 21 through an opening 102 in the plate 22 on the metal sheet forming said column 21. This exposed end of the rod 100 has a knob or handle 103 by which manual operation of the rod, as by pushing in or drawing out, may be effected and facilitated. The other end of the rod has a bifurcated head 105 which straddles the large upper end 86 of the heretofore described sleeve 85. The relation of the bifurcations on the head 105 is such that, when the rod 100 is pushed inwardly, the bifurcations embrace and engage the end 86 of sleeve 85. In this position, any electric current received by the rod 100 will be transmitted to the sleeve 85 and to the socket 81. However, when the rod 100 is drawn outwardly, the bifurcations on the head 105 withdraw from contact with the end 86 of the sleeve 85, breaking any circuit previously existing by reason of such prior contact. This is the position illustrated in Figure 7 of the accompanying drawings.

If desired, suitable means, such as that provided by a stressed coil spring 108, may be furnished to lock and hold the rod 100 in circuit making or open circuit positions. The spring 108 is suitably attached to the under surface of the wall 70, along one side of the path of movement of the rod 100. The spring has a finger 109 extending toward the rod 100 and adapted to enter and be received, at different times, in each of two spaced notches 110 formed in the shank of the rod. The spacial relation of one rod notch 110 to the bifurcated head 105 is such that, when the head is in circuit breaking position, the spring finger 109 will engage in such notch. The other notch 110 is so spaced from the head 105 as to be entered by the finger 109, when the head 105 is in circuit closed position. Thus, the rod 100 is held, resiliently, against any but manually directed movement and in either a circuit making or circuit breaking position.

To connect the switch rod to the source of current provided by the cells 91, we provide a compound dog-leg conductor 115 attached, as at 116, to the under surface of wall 70. One end of the conductor 115 is engaged by the bolt and nut assembly 97 of one discular bus part by which current is conducted from the electrode on one cell 91 to the conductor 115. The other end of the conductor 115 is bent at 117 away from the wall 70 and then, at 118, bent more nearly parallel to and slightly inclined toward said wall. In such relation, the switch rod 100 passes between the conductor end 118 and the under surface of the wall 70. The end 118 of the conductor 115 is resiliently urged by the portion 117 toward the wall 70 and against the shank of the rod 100. This assures, notwithstanding sliding movement of the rod from and to circuit making position, that a good circuit conducting relation exists at all time between the conductor 115 and the rod 100. If desired, this condition may be further enhanced by providing a conductor washer 120 on the under surface of the wall 70 and in opposition to the point at which the conductor end 118 engages the rod 100. The conductor washer 120 may comprise a part in the bolt and nut assembly 97 of the discular bus part.

In addition, the rod 100 may be linearly slotted, along its axis, as at 121, and the bolt of the assembly 97 may extend through said slot 121. This relation of the bolt of assembly 97 and slot 121 not only aids to assure current conduction between the rod and conductor 115 but also provides a simple but effective guide means to the plunging and withdrawal movements of the rod 100 incidental to switch opening and closing.

Thus, it will be seen we provide a truly compact and efficient marker light. We provide by our various described constructions means assuring constant transmission of electric power to the lamp notwithstanding any extensive or aggravated vibration to which the light may be subjected. Our invention in its described embodiment enables the user to quickly and easily dismantle and reassemble the entire marker light as for repair, check or cleaning. We provide an inexpensive but attractive appearing lantern and one which resists infiltration of operation effecting weather and dirt.

We claim:

1. A marker light for railway trains having, in combination, a two part housing, one housing part being vertically aligned with and above the other housing part and being pivotally connected thereto for relative movement of the housing parts about a vertically extending axis concentric with the longitudinal axes of both housing parts, the lowermost housing part providing a base for the marker light, the upper housing part having an internal horizontally extending wall forming two chambers in vertical sequence to each other within the housing part, said wall having electro-conductive bus parts on its upper surface and a lamp bulb socket on its lower surface, means including a switch on said wall electrically connecting said bus elements to said lamp bulb socket, the lowermost chamber having a plurality of lensed ports in focus with a lamp bulb positioned in said lamp bulb socket and having focal axes at right angular relation to each other whereby when electric current is conducted to said lamp bulb socket in the lowermost chamber of the upper housing part to energize a lamp bulb disposed therein, light beams will be cast through said lensed ports and in such directions in reference to vertical axes of said housing parts as the upper housing part pivotally bears to the lower housing part and its supporting means.

2. A marker light for railway trains as described in claim 1 in which said uppermost housing part comprises a vertically extending, hollow, four-sided, open-ended column having one open side and being formed by a single bent sheet of sheet material, said sheet of sheet metal having a tongue extending from one edge of said sheet and across the lower end of said open side of said column to an opposite edge of said sheet and being connected thereto, a metal plate being connected to said sheet edges at points near the upper end of said column and extending across the upper end portion of said open side of the column to thereby partially close said open side, said plate having a channel flange along its lower edge, said tongue having a channel flange along its upper edge, said tongue having a channel flange along its upper edge and parallel to the plate channel flange, a closure panel having a pair of parallel channel flanges in mesh with and slidable on and relative to the tongue and plate channel flanges to thus support the closure panel in closing relation to the portion of the open side of said housing being between said tongue and said metal plate to prevent entry of weather into said housing.

3. A marker light for railway trains as described in claim 2 in which the lower open end of said column has means in closing relation to said lower open end and pivotally connecting the housing parts together comprising a square inverted dish-shaped panel having a centrally disposed drum bearing thereon, said panel being affixed at its edges to the lower end of said column, an annular bearing in nested surrounding relation to said drum bearing and slidably movable thereover, said annular bearing being on said lower housing part, the annular bearing having a plurality of recesses extending radially inward from the outer periphery of said annular bearing, a pin, bearing means on said column and dished panel for slidably supporting said pin for sliding movement towards and away from the vertical axis of said column, a resilient means in engagement with said pin and tending to urge the pin inwardly of the column and, when one of said recesses is in registry with the pin end, to urge the pin end into said recess to lock the housing parts against further relative rotation.

4. A marker light for railway trains as described in claim 1 in which said bus parts on said horizontally extending wall comprise the combination of an annular electro-conductive member for conducting current of one polarity and a discular electro-conductive member for conducting current of the opposite polarity, said discular member having a central opening and being in concentric relation to the aforesaid annular member, said horizontally extending wall having openings, one opening being near the outer edge of said annular member and another opening being near to the common axes of the discular and annular members, an electro-conductive bolt extending through the first named opening and engaging said lamp bulb socket, an electro-conductive washer on said bolt and in engagement with an outer edge of said annular member thereby to electrically connect and mechanically retain the lamp bulb socket and annular member on said horizontally extending wall, a second electro-conductive bolt extending through the second named opening and the opening in said discular member and engaging said switch to thereby electrically connect and mechanically retain the switch and discular member on said horizontally extending wall.

5. A marker light for railway trains as described in claim 1 in which said switch comprises an electro-conductive rod, a handle on one end of the rod most remote from the lamp bulb socket, a bifurcated head on the other end of the rod, the rod having a linearly extending closed end slot in its shank between the rod ends adapted to receive the discular bus member engaging bolt and thereby to electrically connect and slidably support the rod in relation to the discular bus member and the lamp bulb socket, so that when the rod is shifted in directions in which the prong head engages or disengages the lamp bulb socket an electrical circuit between the lamp bulb socket and the discular bus member is made or broken.

References Cited in the file of this patent

UNITED STATES PATENTS

| | | |
|---|---|---|
| 1,168,351 | Wakefield | Jan. 18, 1916 |
| 1,657,363 | Barry | Jan. 24, 1928 |
| 1,733,103 | Spear | Oct. 22, 1929 |
| 1,796,655 | Johns | Mar. 17, 1931 |
| 2,641,686 | Carruthers | June 9, 1953 |